United States Patent [19]

Clements

[11] 4,084,126
[45] Apr. 11, 1978

[54] CONTROLLED AND ENERGIZATION CIRCUIT FOR ELECTRICALLY HEATED VEHICLE WINDOWS

[75] Inventor: John A. Clements, Billericay, England

[73] Assignee: Ford Motor Company, Dearborn, Mich.

[21] Appl. No.: 763,777

[22] Filed: Jan. 31, 1977

[30] Foreign Application Priority Data

Feb. 11, 1976 United Kingdom ............... 5294/76

[51] Int. Cl.² .......................... B60L 1/02; H02J 7/14
[52] U.S. Cl. ..................................... 322/8; 219/202; 307/10 R; 307/10 BP
[58] Field of Search ............... 322/7, 8; 219/202, 203; 307/10 R, 10 BP

[56] References Cited

U.S. PATENT DOCUMENTS

| 3,440,398 | 4/1969 | Nilssen | 219/202 UX |
| 3,571,560 | 3/1971 | Nilssen et al. | 219/202 X |
| 3,858,027 | 12/1974 | Phillips | 219/203 |
| 3,894,242 | 7/1975 | Helling | 322/7 |
| 3,898,423 | 8/1975 | Taylor et al. | 219/203 |

Primary Examiner—Robert J. Hickey
Attorney, Agent, or Firm—Robert A. Benziger; Keith L. Zerschling

[57] ABSTRACT

A control and energization circuit for applying the vehicle alternator output directly to the resistive window heaters is disclosed. By disconnecting the alternator output from the vehicle battery, thereby temporarily interrupting the charging cycle of the battery, substantially the full alternator output may be applied to the window heaters to deice the vehicle windows.

9 Claims, 5 Drawing Figures

1

CONTROLLED AND ENERGIZATION CIRCUIT FOR ELECTRICALLY HEATED VEHICLE WINDOWS

BACKGROUND OF THE INVENTION

1. Field of the Invention

This invention relates to circuits for controlling the energization of electrically heated vehicle windows. More specifically, this invention relates to a control and energization circuit for temporarily applying large quantities of heat to vehicle windows to deice the windows. More specifically still, this invention relates to a circuit for temporarily interrupting the charging cycle of a vehicle battery to apply substantially the entire vehicle alternator output to the electrical resistance window heating elements. More specifically still, the present invention relates to such a circuit which includes protective features to assure that the duration of actuation is brief and subject to available electrical energy for battery operation of other vehicle circuits, that unnecessary actuation is avoided, and that too rapid reactuation is avoided.

2. Description of the Prior Art

Electrical heated rear windows are in common use, and it has been proposed to use electrically heated windscreens. The latter would have the advantage of allowing hot air ducts between the heater matrix and the screen to be dispensed with. Such heated vehicle windows as are in use and as are proposed receive electric energy at an essentially fixed and constant rate. A constant heating rate as presently used is adequate to demist a vehicle window but is not adequate, owing to limitations in the vehicle electrical system, to remove any substantial ice accumulations (to deice) the vehicle windows. However, if an electrically heated window is to be capable of deicing as opposed to mere demisting, a large amount of power is required. Such a requirement would place a heavy strain on the vehicle electrical system. Alternatively, if such a strain on the vehicle electrical system is to be avoided, the time required for electrical deicing would be so great as to render the system of little practical value.

An object of this invention is to provide a circuit which will permit an improved method of electrically deicing vehicle windows.

SUMMARY OF THE INVENTION

The invention accordingly provides a deicing and demisting circuit for use in a vehicle having a generator with a field winding fed from a voltage regulator, at least one window provided with an electrical resistance heating element, and a battery; the circuit comprising: first switching means operable to connect the heating element to the generator output; second switching means normally occupying a first state connecting the generator output to the battery and to the voltage regulator, and switchable to a second state in which the battery is disconnected from the generator output and the field winding is connected to the battery; and a control circuit responsive to a manual actuation to switch the second switching means to said second state for a limited period of time and thereafter to return the second switching means to said first state. The invention provides further for battery sensing means responsive to battery voltage operative to return the second switching means to its first state in the event battery voltage drops below a predetermined value. The invention provides further for deice repeat demand inhibit means to prevent too rapid reactuation of the second switching means. The invention further provides ambient temperature responsive means operative to return the second switching means to its first state in the event ambient temperature is above a selected temperature above the freezing point.

BRIEF DESCRIPTION OF THE DRAWING

Embodiments of the invention will now be described, by way of example, referring to the accompanying drawing, in which.

DETAILED DESCRIPTION

Figure 1:
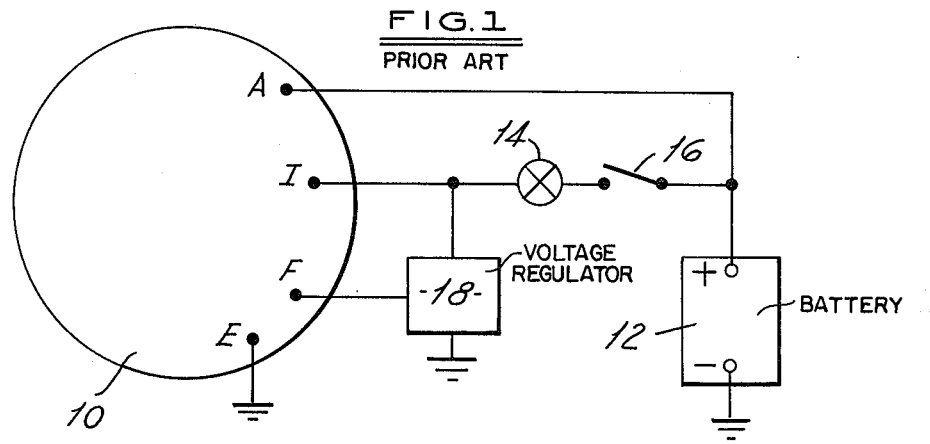
FIG. 1 is a schematic circuit diagram of part of a known vehicle electrical system including a known alternator.

In the known system of FIG. 1, an alternator 10 with integral rectifying circuit has a main electrical output A, ground or common terminal E, an ignition sense terminal I, and a field winding terminal F. The main electrical output A is connected to charge a battery 12. The ignition sense output I is also connected to the battery 12 via an ignition warning light 14 and ignition switch 16. A voltage regulator 18 is connected between the ignition sense output I and the field winding terminal F.

Figure 2:
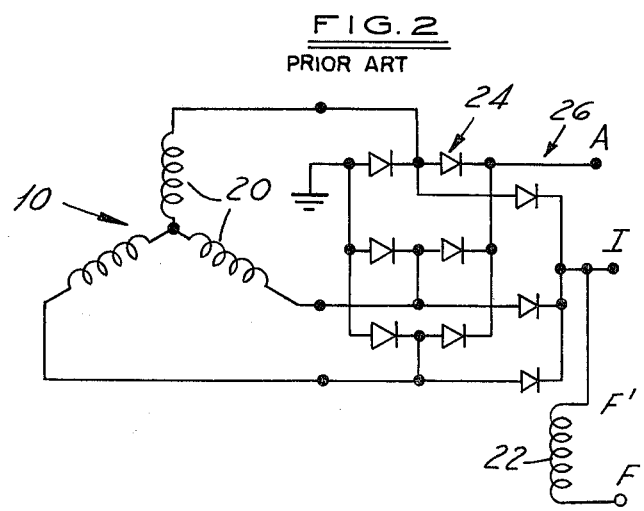
FIG. 2 shows the winding and rectifier connections of the vehicle alternator of FIG. 1.

As seen in FIG. 2, the alternator 10 comprises Y-connected stator windings 20, field winding 22, diode rectifier bridge 24, and protection diodes 26. It will be noted that in this conventional arrangement the end of the field winding 22 opposite the terminal F is connected internally of the alternator to the ignition sense output I. Thus, referring to FIGS. 1 and 2, when the ignition switch 16 is closed, current flows from the battery 12 via the warning lamp 14, which is thereby illuminated, and the voltage regulator 18 to energize the field winding 22. When the vehicle engine is started, the voltages at alternator outputs A and I will equalize and the lamp 14 will be extinguished.

Figure 3:
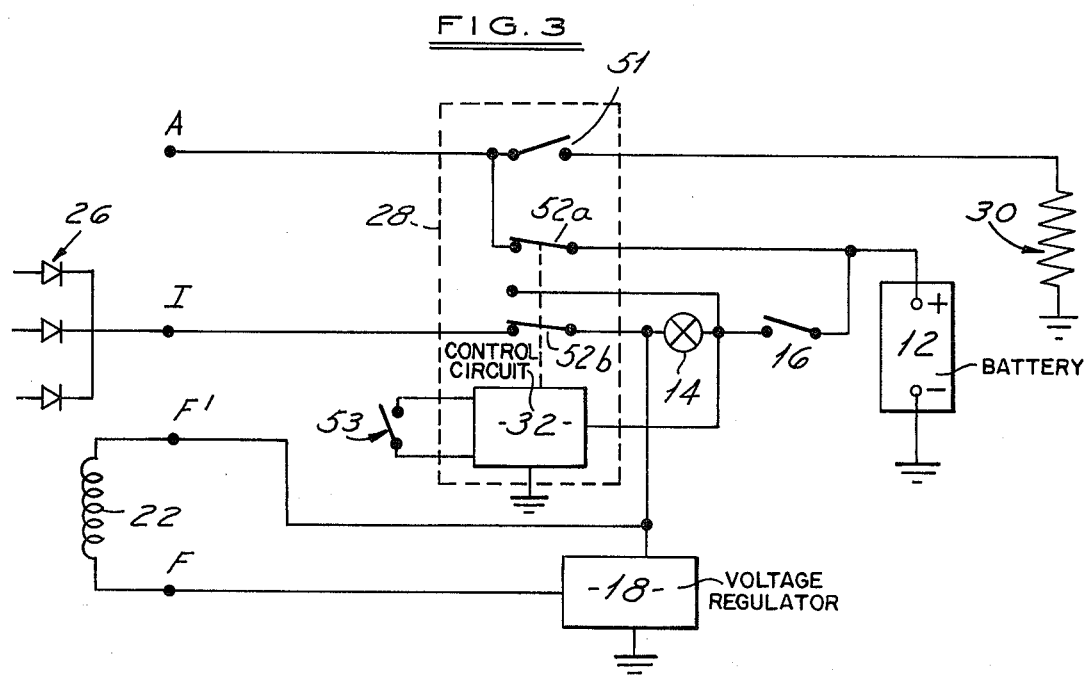
FIG. 3 is a circuit diagram of one embodiment of the present invention.

Turning to FIG. 3, a first embodiment of the invention has a deice/demist control unit generally indicated at 28 interposed between the alternator 10 and a window heating element 30. While heating element 30 is shown symbolically as a resistance, it will be appreciated that this resistance could take the form of a resistive film or of a grid of resistive wires. The control unit 28 includes a first switch 51 which when closed, for example by a vehicle operator, connects the element 30 to the alternator main output A to give either deicing or demisting, as described below. A second switching means comprises switches 52a and 52b ganged together for operation by a control circuit 32. Switch 52a is normally closed to connect the alternator main electrical output A to the battery, while the normal position of switch 52b connects the alternator ignition sense output I to the vehicle ignition switch 16 via the ignition warning lamp 14. In its other position, switch 52b permits a connection of the voltage regulator 18 to the ignition switch 16 by-passing the ignition warning lamp 14.

A difference between the alternator electrical connections of the known arrangement of FIGS. 1 and 2 and the embodiment of FIG. 3 lies in the fact that the field winding 22 has both ends brought out to terminals F, F' the internal connection of the latter end to the terminal I being dispensed with.

The control circuit 32 includes a manually operable deice switch 53. Control circuit 32 is connected to receive battery voltage via the ignition switch 16 when the latter is closed.

In use, the driver may close the switch 51 to connect the window heating element 30 to the alternator main electrical output A, which results in sufficient heating for demisting. Demisting can occur while normal vehicle battery charging current is being applied to battery 12 through normally closed switch 52a. If deicing is desired, the switch 53 may be closed briefly to bring the control circuit 32 into operation.

The control circuit 32 acts to switch the switches 52a, 52b from their normal state to their second state for a predetermined time period. The time period should be selected to be sufficient for deicing. After passage of the selected time period, the switches 52a, 52b will revert to their normal state. When the deicing mode is in operation, switching of switch 52a from its normal state to the second state disconnects the battery 12 from the alternator 10, thereby permitting the full alternator output to be delivered to the heating element 30. Also, the switching of switch 52b disconnects the voltage regulator 18 and battery 12 from the ignition sense terminal I so that the voltage regulator 18 is receiving only battery voltage. This consequently ensures a high field winding current, giving a high alternator output which is being fed solely to the heating element 30. The switch 52b also shunts the ignition warning lamp 14 so that the current flowing from the battery 12 to the voltage regulator 18 does not cause a warning indication.

Figure 4:
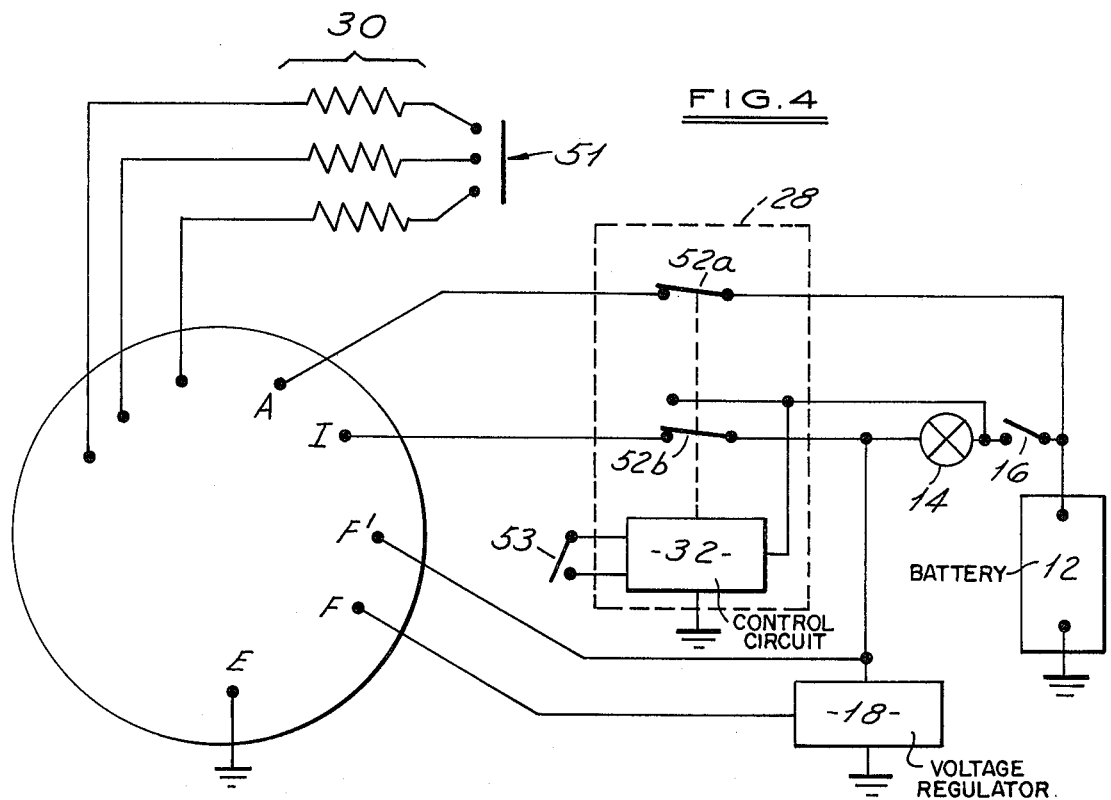
FIG. 4 similarly illustrates a second embodiment.

The embodiment of FIG. 4 is broadly similar to the FIG. 3 embodiment. However, the window heater 30 is divided into three elements each of which is connected to receive the output of one of the alternator a.c. phase windings. The first switch 51 is arranged to complete the Y-connection of the three heater resistances 30. The operation of this embodiment is otherwise the same as for FIG. 3, and like references denote like parts.

Figure 5:
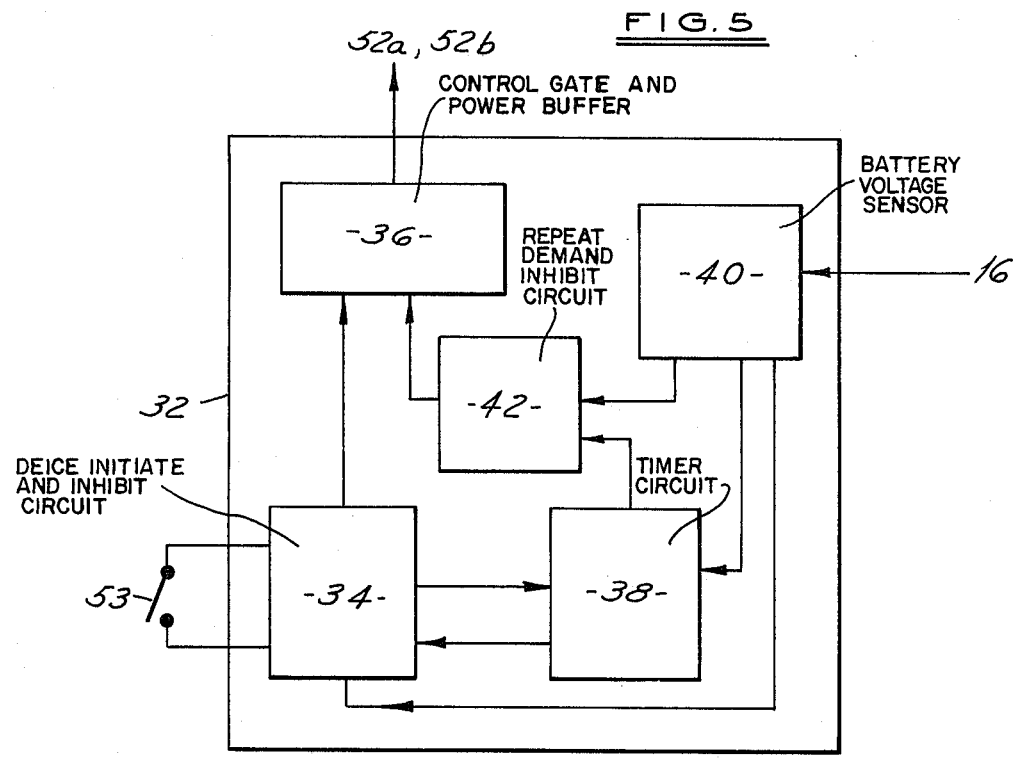
FIG. 5 is a block diagram detailing a control circuit for use in the embodiments of FIGS. 3 and 4.

FIG. 5 illustrates in block form the control circuit 32. Depression of the switch 53 generates an output from a deice initiate and inhibit circuit 34 to set a control gate and power buffer 36, which in turn operates the switches 52 to place them in their off-normal, or other, state. The initiate and inhibit circuit 34 also starts a timer circuit 38. After the predetermined time has elapsed, the timer circuit 38 triggers the initiate and inhibit circuit 34 to reset the gate 36 and thus causes the switches 52 to revert to their original or normal state.

Apart from these basic functions, it is desirable that the control circuit 32 provide various safeguards since undue use of the deice made will severely load the battery, especially if other vehicle electrical equipment such as headlights and windshield wipers are in use. FIG. 5 therefore includes a battery voltage sensor 40 which is arranged to receive a signal indicative of battery voltage and is preferably arranged to respond to the battery voltage falling below a selected predetermined level to actuate the inhibit function of the circuit 34. This sensor 40 may have a long time constant, on the order of about 30 seconds, to allow the vehicle starter motor to be operated without terminating deicing. A deice repeat demand inhibit circuit 42 acts to disable the gate 36 for a fixed time period after each deicing cycle, and may for instance comprise a flip-flop set by the output of the timer 38. The timer circuit 38 may also include a temperature sensor, such as a thermistor, positioned to determine the interior temperature of the vehicle and connected to modify the time period of the deice cycle. Preferably the relationship between the temperature sensor and timer circuit 38 is such that when the interior temperature is more than a few degrees above the freezing point, the deicing mode is terminated a brief time period after initiation.

The switches 52a, 52b are preferably semiconductor switching devices such as power transistors or SCR's. Alternatively, electromagnetic relays may be used. If SCR's are used, the repeat demand inhibit circuit 42 may be dispensed with since the deice mode can only begin with the engine and alternator stopped; if the alternator is producing an output, the forward voltage across the SCR's will prevent turn-off.

The first switch 51 may also include a semiconductor device. In this case, the semiconductor device portion of switch 51 may be operated also by the output of the control gate and power buffer 36. Thus, manual operation of the switch will cause the deice mode to be selected each time, to be followed by demist when the timer 38 or an inhibit operates.

The screen heating element may be an embedded element or a resistance thin film. Although an alternator has been described, a d.c. generator with a field winding may also be used. Delta connections, in place of the described Y-connections are comtemplated.

The invention is particularly applicable to car and truck windshields, but may also be used with other windows in such vehicles or other vehicles such as aircraft.

What I claim is:

1. A circuit for use in a vehicle having an engine operated electrical energy generator with rotor windings and a field winding fed from a voltage regulator, at least one window provided with an electrical resistance heating element, and a battery; the circuit comprising:

first switching means operable to electrically interconnect the heating element to the generator output;

second switching means normally occupying a first state electrically connecting the generator output to the battery and to the voltage regulator, and switchable to a second state in which the battery is disconnected from the generator output and the field winding is electrically connected to the battery;

third switching means; and a control circuit responsive to manual actuation of said third switching means to controllably switch said second switching means to said second state for a period of time and thereafter to return the second switching means to said first state.

2. A circuit according to claim 1, in which the second switching means comprises a first normally closed switch electrically between the generator rotor windings and the battery, and a second normally open switch which in said second state shunts the vehicle ignition warning lamp to provide a direct path between the battery and the voltage regulator.

3. A circuit according to claim 1 in which the control circuit includes a temperature sensor.

4. A circuit according to claim 3 in which the temperature sensor acts to vary said period of time as a function of temperature.

5. A circuit according to claim 1 in which the control circuit includes means for sensing battery voltage operative to inhibit the second switching means from remaining in said second state in the event of the battery voltage being below a predetermined level.

6. A circuit according to claim 1 including means to prevent manual actuation of said third switch means from causing operation of the second switching means until after lapse of a predetermined period of time following the prior operation of said second switching means.

7. A circuit according to claim 1 in which the first switching means is interposed in a supply line for the resistance element.

8. A circuit according to claim 1 for use with an alternator having a three phase output, in which the first switching means is arranged on actuation to connect a plurality of resistance elements across said three phase output.

9. A circuit according to claim 1 in which said second switching means comprise semiconductor switching devices.

* * * * *